United States Patent [19]

Mewitz

[11] Patent Number: 4,571,619
[45] Date of Patent: Feb. 18, 1986

[54] PROGRAMMABLE VIDEO MASK GENERATOR

[75] Inventor: Gerd Mewitz, New Berlin, Wis.

[73] Assignee: General Electric Company, Schenectady, N.Y.

[21] Appl. No.: 637,294

[22] Filed: Aug. 3, 1984

[51] Int. Cl.[4] .................. H04N 5/14; H04N 5/32; H05G 1/64

[52] U.S. Cl. ............................ 358/160; 358/111; 378/99

[58] Field of Search ............... 358/160, 183, 22, 33, 358/111; 340/729, 730; 378/99

[56] References Cited

U.S. PATENT DOCUMENTS

| | | | |
|---|---|---|---|
| 4,228,465 | 10/1980 | Stone et al. | 378/99 |
| 4,355,330 | 10/1982 | Fukui | 358/111 |
| 4,449,195 | 5/1984 | Andrews et al. | 358/111 |
| 4,496,985 | 1/1985 | Jensen et al. | 378/99 |

Primary Examiner—Tommy P. Chin
Assistant Examiner—Michael D. Parker
Attorney, Agent, or Firm—Fuller, House & Hohenfeldt

[57] ABSTRACT

An image displayed on a video monitor screen is surrounded with a uniform dark background. A multiplexer (MUX) has its output coupled to the monitor and one input coupled to a display controller memory for digitized image pixels and another input coupled to a switching circuit for simulating pixel bits which can be all zeros to produce black or dark pixels in the display. For each horizontal scan line the MUX is caused to select the black pixels until the image boundary is reached, then select image pixels until the opposite image boundary is reached and the black pixels are selected again to the end of the line.

3 Claims, 4 Drawing Figures

PROGRAMMABLE VIDEO MASK GENERATOR

BACKGROUND OF THE INVENTION

This invention pertains to a device for surrounding an image displayed on a video monitor with a mask that is black or is a selectable shade of gray.

The new mask generator will be described in a situation where it is used to mask an x-ray image displayed on a raster scanned video monitor screen, but it should be understood that the mask generator is applicable to any digital image processing system.

In x-ray fluorographic systems, the original image typically lies within the boundaries of a circle. This results from the x-ray images being received in an image intensifier which converts them to minified and bright optical images that appear on the circular output phosphor of the intensifier. The visual image on the phosphor is viewed with a video camera which converts the image to analog video signals. The analog video signals are converted to digitized picture elements (pixels) and, typically, the digital data is variously processed and reconverted to analog video signals for permitting display of the circular image on the screen of the monitor. It is desirable to have the field outside of the circular image appear dark on the monitor screen in contrast with the image so that accurate diagnostic information residing in subtle differences in pixel intensities can be distinguished.

According to prior practice a black mask was generated by adding an analog signal that is synchronous with power line frequencey to the analog interlaced video signal before digitization. Variations in line frequency caused the interlace to tear, creating a gear artifact on the circular edge of the mask.

SUMMARY OF THE INVENTION

An objective of the invention is to provide a means for surrounding circular images displayed on a video monitor screen with a mask that is black or a selected shade of gray and to provide for similarly masking images of other symmetrical configurations too.

A further feature of the new mask generator is its programmability for accommodating circles and other geometrical configurations such as rectangular images, in an almost infinite range of sizes.

Briefly stated, in accordance with the invention, the digital image data outside of the image boundary is exchanged with data that has a value of zero for black or no intensity on the monitor and may have selected other values for various shades of gray. The programmable digital mask generator runs synchronously with the digital video data transfer to a digital-to-analog converter (DAC) which converts the analog video signals to digital pixels. The programmable digital mask generator generates a digital signal which controls the select input of a two-to-one multiplexer (MUX). During the raster scan of the monitor in the region outside of the circular or rectangular image, the generator selects one input on the MUX and allows data with a value of zero to be displayed for producing a black mask, for example. When the monitor scan reaches the image boundary, the generator selects an alternate input of the MUX and allows useful image data to be displayed along the existing horizontal scan line. When the scan passes over the next boundary of the image, the first input on the MUX is selected, allowing data with a value of zero to be displayed again to thereby restart writing the mask.

An illustrative embodiment of the new programmable image mask generator will now be described in greater detail in reference to the accompanying drawings.

DESCRIPTION OF A PREFERRED EMBODIMENT

Figure 1:
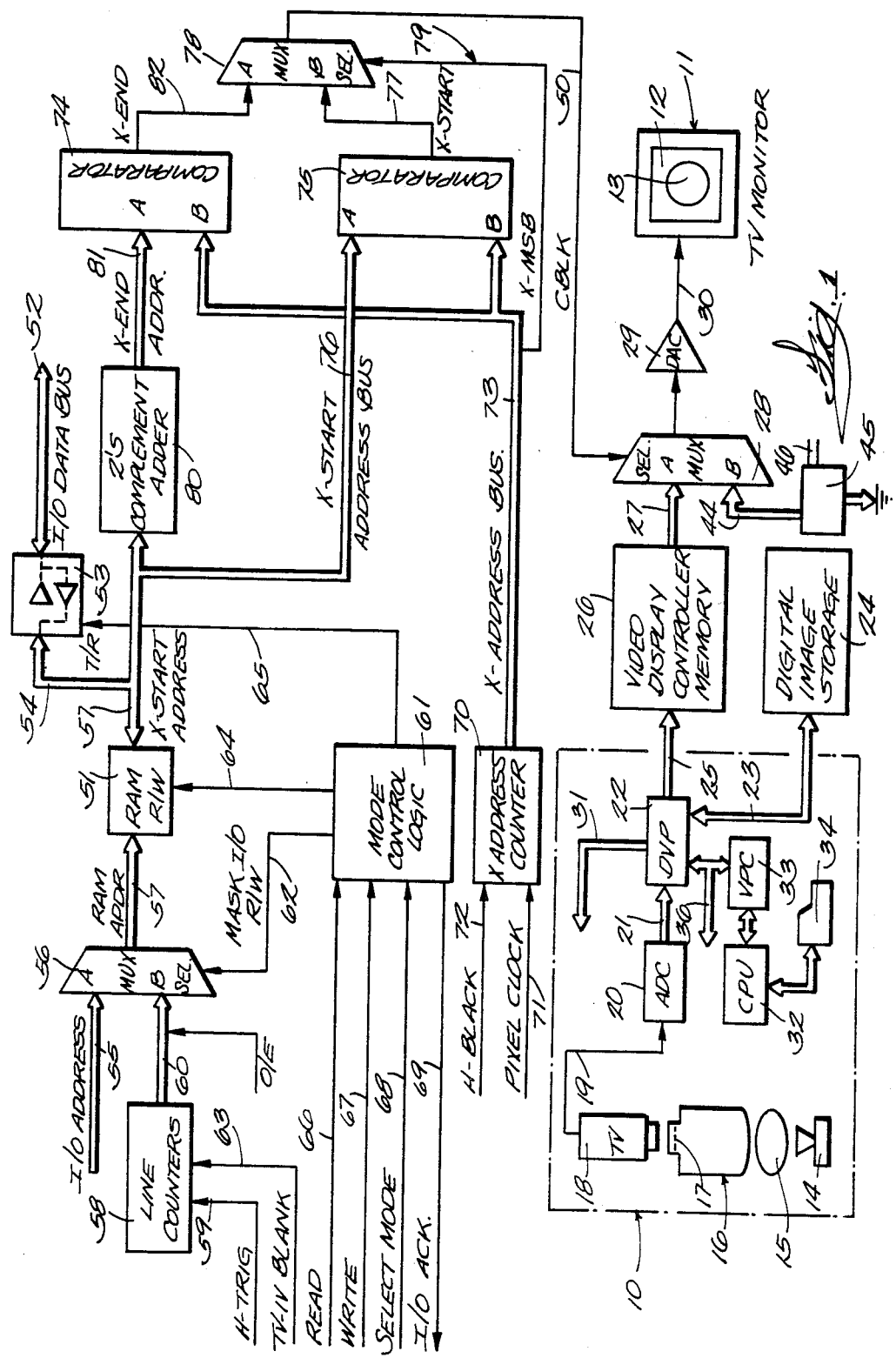
FIG. 1 is a diagram showing the new mask generator used with an x-ray fluorographic imaging system.

In FIG. 1, a digital fluorographic system, within the dashed line rectangle 10, is provided to illustrate one type of system that produces a circular image that is desirably surrounded by a black or other dark mask when displayed on the screen of a video or TV monitor 11. The masked area on the monitor screen is marked 12 and the circular image, in this particular example, is marked 13.

The x-ray system 10 comprises an x-ray tube 14 which projects a beam through a body represented by the ellipse marked 15. The resulting x-ray image emerging from the body is received in an image intensifier 16 which converts it to an optical image. The optical image appears on an output phosphor which is represented by the dashed line marked 17. This phosphor is a circular disk so the image is bounded by a circle. The optical image on phosphor 17 is viewed by a TV or video camera 18 which, in response to raster scanning of the charge pattern on its target, converts the image to analog video signals. Analog video signals are input, by way of a line 19, to an analog-to-digital converter (ADC) 20 which converts the analog signals for every horizontal scan line to digital signals whose values correspond to the intensities of the pixels composing the image. The digital image pixel data is input by way of a bus 21 to a digital video processor (DVP) 22 wherein the image data are variously processed before the image is displayed on the monitor screen. A typical DVP is described in U.S. Pat. No. 4,449,195 which is owned by the assignee of this application.

Typically, in an x-ray fluorograhic procedure a series of images are acquired and a digital data representative of the images is transmitted by way of a bus 23 to a digital image storage device such as that symbolized by the rectangle marked 24. The storage device may, for example, be a digital disk recorder. The digital pixels may have a depth of 8 to 12 bits, by way of example. Before display in real-time or after retrieval from storage, the image data are transmitted from DVP 22 by way of a bus 25, to a full image frame memory of a video display controller 26. Digital data representative of an image are transferred by way of a bus 27 to one input, marked A, of a multiplexer (MUX) 28. This MUX is involved in generating the dark mask. Its function will be described later. The digital pixel values comprising the image are transmitted at video rates to MUX 28 and are input to a digital-to-analog converter (DAC) 29 wherein they are converted to analog video signals and supplied by way of line 30 to the video monitor 11 for driving it and displaying the images.

DVP 22 contains a crystal controlled clock pulse generator, not shown, which for the purposes of the invention, can be considered to be the time base for the entire system. One derivative of the clock causes ADC 20 to convert pixels at a rate such that there are 512 active or unblanked pixels in a horizontal line of about 63.5 microsecond duration. The bus 31 extending from DVP 22 is symbolic of means for conducting data, control and timing signals to other parts of the circuitry. A central processor unit (CPU) 32 is provided. The CPU is coupled by way of a bus to a video processor controller (VPC) 33. The CPU issues general commands or recipes for x-ray exposure and data processing procedures. The VPC interprets a recipe as an instruction to generate the related code words such as addresses and enabling signals that are used by the VPC 22 and other components in the system to execute data transfer and data manipulation functions, for example.

Bus 36 symbolizes the data, address and control bus 36 which couples the VPC to the DVP and other components in the system. A user interface or keyboard 34 is provided for the user to input to system controller CPU 32 information such as for selection of operating modes for the mask generator as will be explained in detail later.

The DVP 22 provides the pixel clock signals which govern the number of pixels into which each horizontal video line is digitized and these clock signals are also used to drive counters whose counts correspond to the addresses of pixels. By way of example and not limitation, and to obtain the clarity that results from illustrating with concrete numbers, in this example it may be assumed that there are 512 active pixels in each horizontal line and the active raster scan contains 483 horizontal lines.

Figure 2:
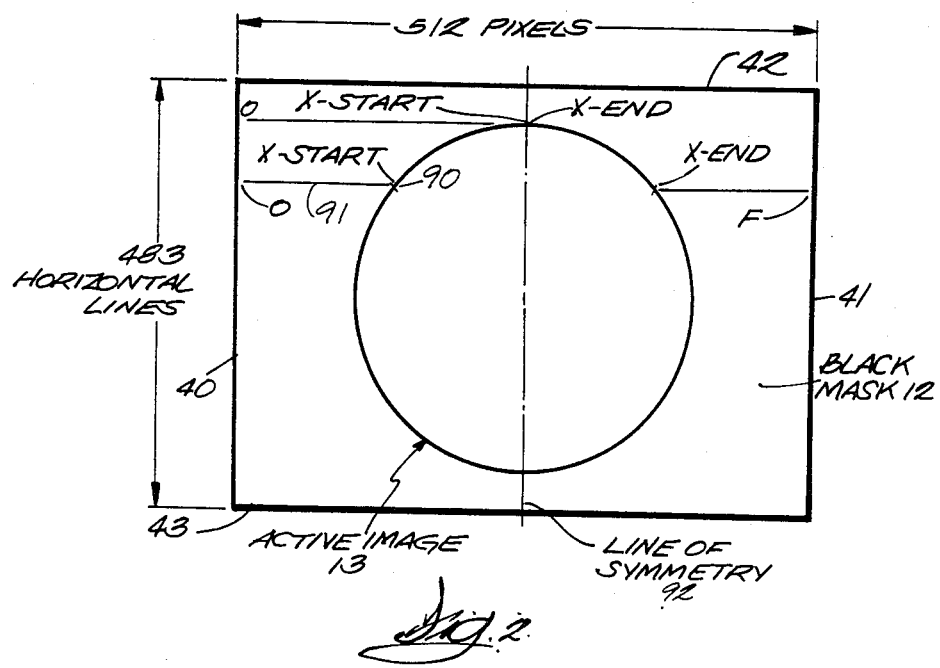
FIGS. 2, 3 and 4 are diagrams that are used to describe operation of the invention.

Before describing the mask generator circuitry in detail in reference to FIG. 1, FIG. 2 will be considered. Here the left and right sides of the active raster are marked 40 and 41 and the top and bottom raster lines are marked 42 and 43. The circular image of interest is again marked 13 and the gray or black mask area that is to surround the circular image is marked 12. Each horizontal line contains 512 active pixels and the raster comprises 483 horizontal lines. Scanning is considered to be from left to right and this is the x-direction. Downward movement of the scanning beam from the top horizontal line is the y-direction. In accordance with the invention, at the end of each horizontal blanking pulse, a shorter pulse is generated. Scanning of a horizontal line from left to right then begins. The scanning of the raster in the x-direction starts, for instance, at points marked zero. In accordance with the invention, from these points or pixels to the point where the scan passes into the active circular image, called the x-start, the scanning beam is blacked out. It then scans across the screen to produce the image and, after the number of pixels along that scan line within the active image have been counted, an x-end signal is produced and the remainder of the horizontal line is blacked again to the right side of the raster or termination of the line marked F.

The details of the mask generator will now be described with reference to FIG. 1. First of all, it should be noted that MUX 28 is the circuit component where black control is effected. This MUX has two inputs A and B. The digital video output signal from video display controller memory 26, which stores the image pixel data, is coupled to input A of MUX 28 of bus 27. A circular blacking signal (CBLK) on line 50 controls MUX 28 so it selects between digital video image data from display controller 26 or input B which is grounded so it causes the blacking on the video monitor screen.

The data that defines the area that is to be black or dark around the image is written into a digital memory which in this example is preferably a random access memory (RAM) 51. The RAM 51 can be loaded with the data for blacking the area around a circular or rectangular image of any size so the RAM imparts flexibility to the system. The CPU 32 has the instructions for loading to the VPC a particular blacking pattern applicable to a circular or rectangular or other symmetrical image of predetermined size. Part of the input-output (I/0) data bus 52 is shown at the top of FIG. 1. This bus transmits blacking data that is sent out of VPC 33. A data direction flow selecting circuit is symbolized by the block marked 53. This implies that data bus 52 is bidirectional. For present purposes it is sufficient to recognize that the blacking area data is switched through component 53-and is delivered by way of a bus 54 to RAM 51. The addresses of the data to RAM are provided over a bus 55 from VPC 33. The addresses are input to a MUX 56 which has two inputs, A and B. The addresses are transmitted to RAM 51 by way of a bus 57. The required capacity of the RAM is reduced by taking advantage of the symmetry of circular and rectangular images about a vertical line through their centers. This will be elaborated later. Provision is made for reading blacking data out of RAM 51 by way of data bus 52 to permit diagnosis of the circuit or a check on the accuracy of the boundary of the circle or rectangle which would contain the image on the monitor within a surrounding dark background. The diagnostic circuitry has been omitted for the sake of brevity. RAM 51 is loaded with what is called x-start data that determines the length of the black pixel series written along a horizontal scan line on the monitor screen. Each x-start digital data word is a count of the number of pixels between the beginning of a horizontal line scan to the pixel that starts the actual image display. This much of each horizontal line is made black or dark and when the scan passes out of the image the remainder of the line is made black or dark. In the case of a circular dark mask, this data changes for every horizontal line.

Horizontal line counters are provided and symbolized by the block marked 58. At the end of each video horizontal blanking interval, as mentioned earlier, a horizontal trigger signal (H-TRIG) is generated. This signal clocks the line counters and is input by way of line 59 to horizontal line counters 58. The counts from counter 58 are represented, in this example, by 9-bit deep digital values which are output on bus 60 and constitute addresses to RAM 51 when the RAM is being read out to perform the blacking function.

A mode control logic circuit is represented by the block marked 61. It has an output line 62 for selecting I/0 address or line counter address. Line 62 is labeled "mask I/0 R/W". This line is connected to the select (SEL) signal input of a MUX 56. For writing x-start data into RAM 51, select line 62 may be at a high logic level in which case MUX 56 is switched so its A input becomes active and addresses for the x-start data can be delivered through the MUX and RAM address bus 57 to RAM 51. When the address lines in RAM 51 are to be addressed for reading out the RAM, select line 62 is switched to a low logic state so input B of MUX 56 becomes active and the addresses from horizontal line counters 58 are passed through the MUX to the RAM. There is another signal synchronized with the H-TRIG signal on line 59 and it is the TV-IV signal which is provided by way of a line 63. The purpose of this signal is to inhibit line counter 58 from counting and hold the counter at zero during the video vertical blanking interval. Another signal labeled 0/E, standing for odd and even, uses part of the line counter 58 address bus 60. RAM 51 can be considered as having two parts, one for low order addresses and another for high order addresses. 0/E becomes line counter address bit 08 and its purpose is to select the low order or high order address locations of the RAM 51. This signal is low during the first field of the video monitor at which time on RAM 51 the signal selects low order addresses and provides x-start addresses on bus 57 for horizontal lines only in the first or odd field of the raster. When the signal goes high, only the high order address locations of RAM 51 are accessed and x-start data only for each horizontal line in the second interlaced field are output from RAM 51 to bus 57 for blacking pixels around the monitor image. In this example, where there are 512 active pixels in a line, the low order addresses would run from 0 to 255 and the high order addresses would run from 256 to 511. Mode control logic block 61 has an output line 64 which switches to a low logic state to enable the RAM 51 for having data written into it. Switching of line 64 to a high logic level enables or conditions RAM 51 for having blacking data read out of it. Another output line 65 from mode control logic 61 provides signals for controlling bidirectional switching devices 53 so data can be read out of RAM 51 and onto data bus 52 or data can be written into the RAM and supplied from data bus 52. There are other inputs to mode control logic circuitry 61. One is a read signal input line 66 which is switched to a high logic level when data is to be read out of RAM and another line 67 which is switched to a high logic level when the RAM is to be enabled for writing data into it. Another line 68 is switched from one logic state to another to inform mode control logic 61 as to whether writing to RAM or reading from RAM operation is be be performed. A line 69 is labeled I/0 ACK and it switches states to acknowledge to the VPC 33 that the RAM has received data or data has been established and is stable on the RAM's data outputs.

As indicated earlier, line counters 58 count the sequence of odd and even horizontal lines beginning with the end of the vertical blanking interval and ending with the last horizontal line on the raster. It is necessary to know what pixel is being written on the display screen of the TV monitor at any instant. Hence, an x-address counter 70 is provided. X-address counter 70 has an input line 71 for a pixel clock signal from the DVP 22. The pixel clock pulses are synchrohized with the pixel locations along a horizontal line. The pixel clock is derived from the DVP 22 time base or master clock. By way of example, the pixel clock frequency for a 60 Hz system, in an actual embodiment, is 12.096 MHz and is 12 MHz for a 50 Hz system. This counter also has another signal input line 72 which is labeled H-BLACK. This signal inhibits the x-address counter from counting pixels in a horizontal line until after the end of the horizontal blanking interval. The pixel counts, expressed as 8-bit digital numbers are output on 9-bit x-address bus 73 and constitute the addresses of the sequence of pixels along a horizontal line. These addresses are supplied to input B of a first digital comparator 75 and simultaneously to the B input to a second comparator 74. In accordance with the invention only 256 addresses are necessary, each expressed as an 8-bit digital word, to black the greatest amount of a horizontal scan line even though there are twice as many or 512 active pixels in a line in this example. The x-start data, as designated in FIG. 1, is delivered by way of a bus 76 from RAM 51 to the A input of first digital comparator 75. The x-start data represents the number of pixels that are to be black or dark starting on any horizontal line within which any part of the image resides and ending wherever the active image starts on that line. For example, referring to FIG. 2, the x-start value for any horizontal line would represent the number of pixel locations existing between the point marked 0 which is the starting point for a horizontal scan on the horizontal line marked 91, for example, and the point marked x-start where the scan enters the circular image. Similar data is required for a horizontal line if the image is circular or rectangular or other configuration and has equal area and geometrically shaped parts on opposite sides of a vertical line of symmetry through the image as indicated in FIG. 2. In accordance with the invention, the distance from zero to x-start is the same as the distance from x-end to F, the finish of the horizontal scan line under consideration.

Referring again to FIG. 1, the x-start pixel number, that is, the address of the pixel is input to input A of first comparator 75 and is compared with the current x-address, determined by address counter 70, that is input to the B input of this comparator. While the x-address to input B and the x-start address data to input A of comparator 75 still differ, the output line 77 of this comparator remains at a high logic level. This high signal is continuously passed from input B of a MUX 78 to its output line 50 which connects to the select (SEL) input of MUX 28. With a high logic level circle blacking (CBLK) signal applied to the select input of MUX 28, input B of MUX 28 is selected so that a value of zero is displayed along the current horizontal line up to the point of x-start as in FIG. 2. This means that the horizontal line is black up to the x-start point. The bus 44 couples input B of MUX 28 to a parallel line switching device represented by the block marked 45. Bus 44 may have as many lines as there are bits in a pixel or it may have lines for some bits. With appropriate decoder signals applied to control lines 46 any switch can ground the bus line it is in. If all switches are made conductive to ground all lines to input B of MUX 28 would be at zero logic level so the simulated pixel would be all zeros and would result in the blackest pixels being written on the monitor screen. If only some of the lines in bus 44 are switched to ground the simulated digital pixel value would be above zero so less black or some shade of gray field would surround the circular image on the monitor screen. This is an important feature for it permits, not only black pixels to be written which is most common, but it permits simulating and writing pixels of uniform intensity for background to the image that have selectable shades of gray as well. Providing for writing black pixels and two or three shades of gray pixels is usually sufficient.

X-address bus 73 has eight lines for the address bits and at least one extra line. Thus where the horizontal scan lines are divided into 512 active pixels and the image is symmetrical and centered on the video monitor screen, 8-bit addresses, representing a count of 256 pixels, will coincide with the scanning beam being at the center of the image or right on the line of symmetry 92, for example, in FIG. 2. Thus, when the ninth bit, which is the most significant bit (MSB) is set to logic 1 level, 256 pixels have been counted along every horizontal line. The signal corresponding to the ninth bit being set is taken from one of the lines in bus 73 and conducted by way of a line 79 to the select signal input of MUX 78. This closes off input B of MUX 78 at the 256th address or count and select line 50 remains low so image data can still pass from display controller memory 26.

However, the A input of MUX 78 is opened or switched on when the x-address most significant bit or select signal on line 79 to that MUX is received as an indication that one-half of the total number of pixels in the horizontal line have been counted.

The pixel count, expressed as pixel addresses, across a horizontal line is also supplied by x-address bus 73 to the B input of comparator 74. A 2's complement adder 80 is interposed between x-start data storage RAM 51 and the A input of second comparator 74. The x-start data for the particular line that is being scanned is input to the 2's complement adder 80. As is well known to those skilled in digital processing art, taking the 2's complement of a number results in a binary number that is the negative of the original number. This negative of the x-start data is supplied by way of a bus 81 to input A of second comparator 74 for each horizontal line before scanning of the particular horizontal line begins. The 2's complement values constitute the x-end addresses which are the addresses of the pixels where the scanning beam crosses the boundary of the image while moving in the right direction in FIG. 2. At this point blacking of the horizontal line resumes until the last pixel or point F at the right side of the raster is reached.

As indicated, x-address bus 73 has eight lines for address bits. Thus, the largest binary number it can conduct is an 8-bit number comprised of all ones which is equivalent to decimal number 255. One additional count will produce decimal 256 which is one-half of the 512 pixels in a horizontal raster line in this example. The count of the 256th pixel is at input B of second comparator 74 at the time first comparator 75 is deactivated by setting of the ninth bit on x-address bus 73. Thus, at the 256th pixel, the input to input B of second comparator 74 is zero again. Meanwhile the negative x-end address input to input A of comparator 74 is present. Now as pixel counting continues to the right of the center of the image, the input to input B of second comparator 74 continues to increase above zero. This count will continue to be compared with the x-end address, which is the negative of x-start, fed to input A of second comparator 74. When the B input becomes greater than A in magnitude, a comparison is made by comparator 74, which processes the second half of the pixels' addresses in a line, and its output line 82 switches from a low logic level to a high logic level. This high logic level signal on line 82 is then transmitted from input A of MUX 78 through the MUX, and by way of select line 50, to the select input of MUX 28. This effectively selects the B or ground inputs to MUX 28 and closes the image data input A so that the input to DAC 29 becomes effectively grounded and the scanning beam of the video monitor 11 is driven black until the end of the horizontal line is reached.

For the sake of clarity, an example using concrete numbers will be given. Referring to FIG. 2, assume that the x-start data value is ninety pixels on the particular horizontal line which is indicated by the numeral 91. At the start of the horizontal line 91, that is, at point zero, x-address counter 70 would start to count up and the first comparator 75 would receive this count or address at its B input. The count of ninety pixels, or the x-start data, would be supplied from RAM 51 by way of bus 76 to input A of first comparator 75. Prior to the time that the x-address to input B and the x-address input to input A of comparator 75 compare, the output of the first comparator 75 on line 77 is at a high logic level. This high signal is transmitted through MUX 78 to select line 50 which, by way of the select signal input to MUX 28 causes the B input of MUX 28 to be selected so all black pixels are written on the video screen along the particular horizontal line. When a comparison is made, that is, when the x-address is greater than the x-start data value of ninety in this example, the output of first comparator 75 switches to a low logic level which allows the image information from video display controller memory 26 to pass through MUX 28. But the pixel address values to input B of comparator 75 continue to increase. When the address reaches 256, the ninth bit is set and MUX 78 is switched from having its B input active to having its A input active. When the ninth bit was set, x-address bus count returned to zero again so the count to input B of comparator 74 was zero at that time. Now as the address value increases above 256, image data is still being transmitted through MUX 28. When the x-address finally counts up to 512 minus 90 there is a comparison with the x-end address which is the negative value of the ninety count at which time the output of second comparator 74 changes state and this signal is transmitted from input A of MUX 78 to the select line 50 for causing MUX 28 to switch and ground input B so that a black horizontal line will be written from x-end (which is the 512th minus ninety pixel) to the end pixel F in that horizontal line.

A stepped or gear effect that was prevalent in the prior art analog circle generating scheme is eliminated with the present invention and a circular image appears smooth to the eye. This is so because the x-start and x-end addresses can be determined within one pixel accuracy. In a typical display monitor, a pixel has a width along a horizontal line of only about six mils and steps of this magnitude cannot be perceived by the eye.

Figures 3, 4:
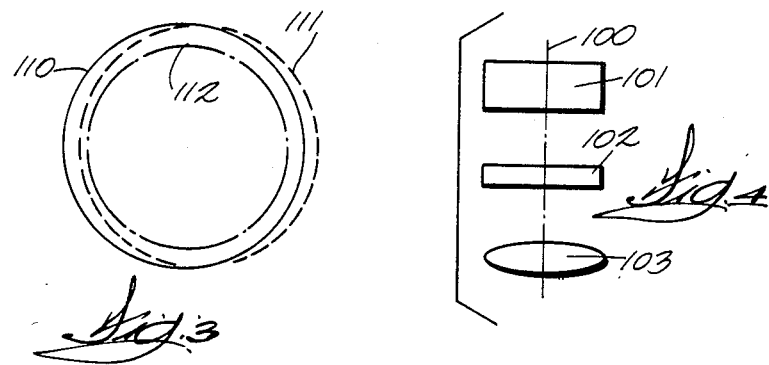

From the foregoing description it should be evident that the invention permits forming a black field around an image regardless of its shape as long as it is symmetrical about a center line of symmetry on the display screen. Some examples of such images are shown in FIG. 4. The line of symmetry of vertical center line down the screen is marked 100. Rectangles, for example, 101 and 102 of different heights and widths may be encompassed by a black field. Configurations such as ellipse 103 is another example of an area that can be surrounded by a black field.

FIG. 3 is for illustrating an important use of the new black field generator. In digital subtraction angiography, for example, one digitized image must be subtracted from another.

It is important to have pixels corresponding to each other in the two images and to a given point in the body register before subtraction is carried out. Sometimes there is voluntary or involuntary movement of the patient's tissue between the times the two images were acquired. This causes pixel misregistration between images. In fluorographic images such as the one outlined in connection with FIG. 1, the DVP has a capability of shifting at least one image to bring about registration of its pixels with the other before subtraction. The resulting image data is then non-circular which would be a distraction to the diagnostician viewing the image. In reference to FIG. 3, for example, one image defined by the solid line boundary 110 may not be coincident with the other image whose boundary is represented by the dashed line 111. The invention can be used to define a circle whose boundary is represented by the dashed-dot line 112 so that only those parts of the image resulting from subtraction appear on the screen of the video monitor and the area around circle 112 will be black.

Although a preferred embodiment of the invention has been described in detail, such description is intended to be illustrative rather than limiting, for the invention may be variously embodied and is to be limited only by interpretation of the claims which follow.

I claim:

1. For a system wherein an image is acquired with a raster scanned video system and an analog-to-digital converter (ADC) converts the analog video signals for each horizontal line at a pixel clock pulse rate to digital signals whose values represent the intensities of the picture elements (pixels) composing the image, and digital pixel data for an image frame are stored in a display memory to be accessed for driving a video monitor to write the image on its screen, and the image is symmetrical relative to a vertical center line of a raster scanned screen, improved means for surrounding said image with a field of uniform selected intensity when the image is written on the screen, comprising:

a display control multiplexer having a first input coupled to said display memory for storing the digital pixel data composing the image and a second input coupled to a selectable pixel intensity source, and having an output coupled to said video monitor, said MUX responding to alternate select signal states coupled to its select input by gating the signals on one or the other of its inputs to its output, a memory for storing digital x-start addresses of the respective pixels in each horizontal line at which writing of image data is to start, first digital counter means incremented by one for each horizontal line in a raster, outputs of said counter constituting addresses to the memory and the memory responding to an address by outputting the x-start address for the corresponding horizontal line, second digital counter means incremented by one for every pixel clock pulse, having count outputs constituting x-addresses of the pixels running from the first to the last pixel in a horizontal line, first and second comparator means each having at least two inputs and an output, bus means for coupling said x-addresses simultaneously to one input of each of said comparator means, said bus means including at least enough lines for conducting a digital x-address having a sufficient number of bits including a most significant bit to represent one-half of the total number of pixels in a horizontal line, 2's complement converter means having input means for said x-start addresses and having output means and operative to convert said x-start addresses to the equivalents of their negative values representative of pixel x-end addresses at the ends of the image in the horizontal scan lines in order to produce a symmetrical image, multiplexing means having an output and one input coupled to said first comparator means output, said multiplexing means being in a state for switching a select signal of one state from the first comparator means output to said multiplexing means output until the x-address becomes greater than the x-start address applied to said first comparator, said select signal of one state causing said display control multiplexer to couple said source to said video monitor for writing the pixels of selected intensity, and when said x-start address and x-addresses compare, said first comparator means output changing on the next pixel x-address increment to a select signal of another state causing said display memory to be coupled to said video monitor so it writes image pixels, said multiplexing means responding to the most significant bit of the x-addresses supplied to said first comparator means being set in correspondence with one-half of the pixels in a line being counted by coupling the other input of said multiplexing means to the output of the second comparator, whose select signal output state is such as to maintain writing of image data on the line, said second comparator continuing to compare the x-addresses, starting with the first one in the second half of the total pixel addresses with the x-end addresses, and when an x-address is greater than an x-end address, the output select signal from the second comparator changes to the state for causing said display control multiplexer to couple said selectable signal source again for said monitor to write pixels of selected intensity to the end of the horizontal line.

2. The system according to claim 1 wherein there are a total of 512 pixels in a horizontal line of the video monitor, said x-addresses are represented by digital values up to eight bits plus a ninth most significant bit which is set at an x-address of 256 constituting one-half of the pixels in a horizontal scan line whereupon the x-address count starts again with all zero bits for the following increasing x-address values supplied to the one input of the second comparator to be compared with the x-end addresses of equal value but opposite sign of the x-start addresses.

3. The system according to claim 1 wherein said selectable signal source includes switch means operable to selectively connect the bit input lines to said other input of said display control multiplexer to ground to thereby simulate digital pixels composed of selected combinations of zeros and ones.

* * * * *